(12) United States Patent
Brown (10) Patent No.: US 8,412,485 B2
(45) Date of Patent: Apr. 2, 2013

(54) SYSTEM AND METHOD OF MONITORING A LOAD CONDITION OF A VEHICLE

(75) Inventor: Duncan Brown, York (GB)

(73) Assignee: Vishay PM Onboard Ltd., Bradford (GB)

( * ) Notice: Subject to any disclaimer, the term of this patent is extended or adjusted under 35 U.S.C. 154(b) by 525 days.

(21) Appl. No.: 12/797,968

(22) Filed: Jun. 10, 2010

(65) Prior Publication Data

US 2010/0289658 A1    Nov. 18, 2010

Related U.S. Application Data

(63) Continuation of application No. 11/717,332, filed on Mar. 13, 2007, now Pat. No. 7,761,258.

(51) Int. Cl.
*G01G 19/14* (2006.01)
*G01M 1/00* (2006.01)

(52) U.S. Cl. ............. 702/174; 73/65; 73/1.13; 73/1.15; 340/440

(58) Field of Classification Search .................. 702/174; 340/440
See application file for complete search history.

(56) References Cited

U.S. PATENT DOCUMENTS

| | | | |
|---|---|---|---|
| 3,480,095 A | 11/1969 | Tuchman | 177/137 |
| 3,717,104 A | 2/1973 | Law et al. | 105/164 |
| 4,384,628 A | 5/1983 | Jackson | 177/137 |
| 4,635,739 A | 1/1987 | Foley et al. | 177/45 |
| 4,691,792 A | 9/1987 | Shintani | 177/1 |
| 4,832,141 A | 5/1989 | Perini et al. | 177/141 |
| 4,917,197 A | 4/1990 | Waite, Jr. | 177/137 |
| 5,141,065 A | 8/1992 | Maxwell et al. | 177/210 R |
| 5,161,628 A | 11/1992 | Wirth | 177/137 |
| 5,167,289 A | 12/1992 | Stevenson | 177/141 |
| 5,376,760 A | 12/1994 | Horsley | 177/137 |
| 5,391,843 A | 2/1995 | Sato et al. | 177/141 |
| 5,546,805 A | 8/1996 | Swartz et al. | 73/514.02 |
| 5,677,498 A | 10/1997 | Oakes et al. | |
| 5,814,771 A | 9/1998 | Oakes et al. | |
| 5,844,474 A | 12/1998 | Saling et al. | 340/440 |
| 5,895,892 A | 4/1999 | Braun | 177/45 |
| 5,963,128 A * | 10/1999 | McClelland | 340/447 |
| 6,025,563 A | 2/2000 | Lesesky et al. | 177/136 |
| 6,363,331 B1 | 3/2002 | Kyrtsos | 702/175 |
| 6,431,557 B1 | 8/2002 | Terborn et al. | 280/6.15 |
| 6,486,773 B1 * | 11/2002 | Bailie et al. | 340/445 |
| 6,523,424 B1 | 2/2003 | Hayes et al. | 73/862.391 |

(Continued)

FOREIGN PATENT DOCUMENTS

DE    42 14 785    11/1993
EP    0 337 488    10/1989

(Continued)

OTHER PUBLICATIONS

Examination Report from Intellectual Property Office of New Zealand dated Dec. 20, 2010.

(Continued)

*Primary Examiner* — Lisa Caputo
*Assistant Examiner* — Jamel Williams
(74) *Attorney, Agent, or Firm* — Harness, Dickey & Pierce, P.L.C.

(57) ABSTRACT

A system and method for indicating the load condition of a vehicle having suspension components comprising:
  at least one of an inclinometer or an accelerometer mounted on at least one suspension component to measure the deflection angle of the suspension component; and
  a controller configured to use deflection angle and generate an output representative of the load condition of the vehicle.

14 Claims, 11 Drawing Sheets

U.S. PATENT DOCUMENTS

| | | | | |
|---|---|---|---|---|
| 6,560,561 | B1 | 5/2003 | Foster et al. | 702/174 |
| 6,566,864 | B1 | 5/2003 | Brown et al. | 324/207.2 |
| 6,580,365 | B2 * | 6/2003 | Starkey | 340/447 |
| 6,864,785 | B2 * | 3/2005 | Marguet et al. | 340/447 |
| 6,888,446 | B2 * | 5/2005 | Nantz et al. | 340/433 |
| 6,904,796 | B2 * | 6/2005 | Pacsai et al. | 73/146.8 |
| 6,920,785 | B2 * | 7/2005 | Toyofuku | 73/146 |
| 6,959,932 | B2 | 11/2005 | Svartz et al. | 280/5.514 |
| 6,963,274 | B2 * | 11/2005 | Saheki et al. | 340/447 |
| 7,141,746 | B1 | 11/2006 | Scott | 177/137 |
| 7,234,345 | B2 * | 6/2007 | Watabe et al. | 73/146.5 |
| 7,253,726 | B2 * | 8/2007 | Okubo | 340/447 |
| 7,336,161 | B2 * | 2/2008 | Walraet | 340/442 |
| 7,423,532 | B2 * | 9/2008 | Stewart et al. | 340/572.1 |
| 7,427,915 | B2 * | 9/2008 | Ogawa et al. | 340/442 |
| 7,508,299 | B2 * | 3/2009 | Thomas | 340/438 |
| 7,557,698 | B2 * | 7/2009 | Osumi et al. | 340/442 |
| 7,612,303 | B1 | 11/2009 | Floyd | 177/141 |
| 8,085,142 | B2 * | 12/2011 | Kawase et al. | 340/447 |
| 2002/0111767 | A1 | 8/2002 | Lueschow et al. | 702/175 |
| 2003/0020605 | A1 * | 1/2003 | Starkey | 340/447 |
| 2005/0167165 | A1 | 8/2005 | Takeda et al. | |
| 2006/0036358 | A1 | 2/2006 | Hale et al. | |
| 2006/0044125 | A1 * | 3/2006 | Pierbon | 340/442 |
| 2009/0088939 | A1 * | 4/2009 | To et al. | 701/72 |
| 2009/0173149 | A1 * | 7/2009 | Bork et al. | 73/146 |
| 2009/0266620 | A1 | 10/2009 | Kallonen | |
| 2010/0324858 | A1 * | 12/2010 | Pannek et al. | 702/141 |
| 2011/0132081 | A1 * | 6/2011 | Lee et al. | 73/146.5 |

FOREIGN PATENT DOCUMENTS

| | | |
|---|---|---|
| EP | 0 337 488 A2 | 10/1989 |
| EP | 1 356 963 | 10/2003 |
| EP | 1 356 963 A1 | 10/2003 |
| EP | 1356963 A1 | 10/2003 |
| FR | 2811423 | 12/2000 |
| GB | 2136141 | 9/1984 |
| GB | 2 313 347 A | 11/1997 |
| GB | 2421343 | 6/2006 |
| JP | 57-102823 | 12/1980 |
| JP | 5-142021 | 6/1993 |
| JP | 9-113341 | 5/1997 |
| JP | 2001-507648 A | 6/2001 |
| JP | 2003-182476 A | 7/2003 |
| NZ | 204820 | 7/1983 |
| NZ | 512956 | 9/2003 |
| RU | 1812445 A1 | 4/1993 |
| SE | 525762 | 9/2003 |
| WO | 90/13798 | 11/1990 |
| WO | WO 97/43605 | 11/1997 |
| WO | WO 98/25779 A1 | 12/1997 |
| WO | WO/2006/043872 | 10/2005 |
| WO | WO 2005/123427 A1 | 12/2005 |
| WO | WO 2006/072667 | 7/2006 |
| WO | WO 2006/072667 A1 | 7/2006 |
| WO | WO 2007/140140 A2 | 12/2007 |

OTHER PUBLICATIONS

Decision on Grant dated Dec. 7, 2011 from corresponding Russian Federation Application No. 2009/12466, filed Oct. 31, 2007 (including English translation of Decision on Grant) (received by the Russian associate on Feb. 10, 2012).

Examination Report dated Dec. 19, 2011 from corresponding Great Britain Application No. GB 0705019.8 (received on Dec. 27, 2011).

Examination Report from Intellectual Property Office of United Kingdom dated Jan. 20, 2011.

Combined Search and Examination Report issued in corresponding United Kingdom Application No. GB0623802.6.

International Search Report dated Feb. 13, 2008.

International Search Report issued in corresponding UK App. No. GB0705019.8.

Preliminary Notice of Rejection (dated Apr. 6, 2012) issued by the Japanese Patent Office regarding Japanese Application No. JP2009-538605 (received by the Japanese associates on Apr. 10, 2012), 3 pages.

English translation of Preliminary Notice of Rejection (dated Apr. 6, 2012) issued by the Japanese Patent Office regarding Japanese Application No. JP2009-538605 (received by the Japanese associates on Apr. 10, 2012), 3 pages.

Official Communication from the Great Britain Patent Office, dated Jul. 5, 2011 (36 pages, comprising third party observations and Appendices A1-A7 and B1-B4).

Official Letter dated Oct. 18, 2011 from corresponding Russian Federation Application No. 2009/12466, filed Oct. 31, 2007 (including English translation of Official Letter).

Notice of Rejection (dated Oct. 23, 2012) issued by the Japanese Patent Office regarding Japanese Application No. JP2009-538605, 3 pages.

English translation of Notice of Rejection (dated Oct. 23, 2012) issued by the Japanese Patent Office regarding Japanese Application No. JP2009-538605, 4 pages.

* cited by examiner

Prior Art

Figure 1

Prior Art

Figure 2

Prior Art

Figure 10.1

SYSTEM AND METHOD OF MONITORING A LOAD CONDITION OF A VEHICLE

CROSS-REFERENCE TO RELATED APPLICATIONS

This application is a continuation of U.S. patent application Ser. No. 11/717,332 filed on Mar. 13, 2007. This application further claims the benefit of Great Britain Application No. 0623806.6 filed Nov. 29, 2006. The disclosure of the above application is incorporated herein by reference.

FIELD

The present invention relates to a system and method for indicating the state of loading of (for example) a commercial vehicle.

BACKGROUND

There are many reasons for fitting to a commercial vehicle a weighing system for indicating the state of payload or loading (e.g. payload safety and load optimisation). Commercial motor vehicles are designed to move quantities of materials or goods on public roads. The vehicles are subject therefore to the interests of local, regional or national authorities who are particularly interested in vehicle overloading which may lead to possibly dangerous driving conditions for the operator and other road users. Another interest arises from the perspective of road or bridge damage by prolonged use by overloaded vehicles. The responsible vehicle operator also has a need to ensure that the payload per journey is maximised safely for commercial reasons.

A commercial vehicle is typically made up of three major components for description purposes, namely multi-component suspension assemblies, a chassis and a body. Each suspension assembly itself is made up of a number of suspension components such as axle housings, beams, springs, damping components and bearings. Under loading conditions, these suspension components will move relative to each other and also relative to the chassis or body.

Early weighing systems to indicate axle or vehicle overloading rely on sensors which react to the movement of one of these components relative to another of these components within the suspension assembly or one of these components relative to the chassis or body. These early weighing systems therefore rely on a dynamic device which is attached physically to a number of components that move relative to each other in order to indicate the relative position of one component to another. The dynamic device may be considered as a two (or more) part device and the extent to which parts move (or are affected by the movement of other parts) can be related to the payload weight. One such device is disclosed in U.S. Pat. No. 6,566,864. A conventional weighing system of this type is adversely affected by the very harsh environmental conditions in which it is installed and special measures are required to enable adequate sealing or shielding of the device in service. The weighing system is inherently susceptible to damage from large resilient objects caught or thrown up from a road surface. A device can be damaged if the axle or wheel encounters an over-travel event not typically seen in service (such as travelling on a particularly poor surface or as a result of a vehicle collision).

SUMMARY

The present invention relates to a system for indicating the state of loading of a vehicle which exploits a transducer intimately mounted on or attached to a suspension component of a suspension assembly.

Thus viewed from one aspect the present invention provides a system for indicating the state of loading of a vehicle having suspension components comprising:

a transducer mountable on a single suspension component such that a signal relating to the angular deflection of the suspension component can be generated; and a controller configured to receive the signal and generate an output representative of the state of loading of the vehicle.

The system of the invention has the advantage that the transducer is mountable on a single suspension component and does not suffer the disadvantages occasioned by debris and is resilient to over-travel events. There are also no disadvantages as are typically experienced with systems of the prior art whereby mechanical wear can be a significant drawback and the connecting portions of two or more pieces require sealing.

Typically the transducer is a one-piece measuring device. In a preferred embodiment, the system comprises a plurality of one-piece devices, each mountable mountable on a single suspension component (eg close to a vehicle axle). Preferably each of the plurality of one-piece devices is mountable on a different suspension component. Preferably each of the plurality of one-piece devices is mountable on a suspension component of a different suspension assembly. Preferably a one-piece device is mountable on a suspension component of each suspension assembly (eg each of the offside and nearside, front and rear suspension assemblies).

The transducer may be a static device. The transducer may be or incorporate an inclinometer or accelerometer. The transducer may be mountable close to a vehicle axle. The suspension component may be a component of a rubber suspension assembly, a trailing arm-type suspension assembly, a leaf-spring suspension assembly or a damper (such as a shock absorber or spring eg coiled or airbag spring) suspension assembly.

The system may include a reference device capable of measuring the angle of inclination of the vehicle chassis or body. A knowledge of the angle of inclination of the vehicle chassis or body may be used to adjust the value of the angles measured by the transducers to allow use of the system on ground that is not level (ie on an incline).

The system preferably further comprises at least one reference device adapted to generate a reference signal relating to the attitude of the vehicle, wherein the controller is further configured to receive the reference signal and adapt the output signal representative of the state of load to account for the variance in the or each deflection angle created by the attitude of the vehicle.

The (or each) reference device is typically fitted to the vehicle remote from the suspension assembly. The (or each) reference device may be fitted to the vehicle chassis or body. Typically the (or each) reference device is fitted to an upper part of the vehicle chassis or body.

Preferably the controller output signal activates a sensory output device.

The system preferably further comprises a display. Preferably the display is the sensory output device. Preferably the display and the controller are integrated to form a single unit. Preferably the display is used to program the controller.

The system may be configured to detect a disturbance. In a preferred embodiment, the controller is configured to detect whether the vehicle is subject to a disturbance. Preferably the disturbance is vehicle movement, vehicle loading or vehicle unloading. Preferably the disturbance detector is adapted to interrupt the sensory output of the supervisory device during the disturbance.

Preferably each of a plurality of transducers is mountable on a different suspension component. Preferably each of the plurality of transducers is mountable on a single suspension component of a different suspension assembly. Preferably a transducer is mountable on a single suspension component of each suspension assembly (e.g. each of the offside and nearside, front and rear suspension assemblies).

Viewed from a further aspect the present invention provides a wheeled vehicle having suspension components comprising:

a system as defined hereinbefore, wherein the transducer is mounted on a suspension component.

Preferably the transducer is mounted close to a vehicle axle.

Preferably the wheeled vehicle comprises a suspension assembly at each of the offside front corner, offside rear corner, nearside front corner and nearside rear corner.

The transducer device may be mounted on (for example) a strut, leaf spring or trailing arm of the suspension assembly. Typically the transducer is intimately mounted (eg adhered or fastened) on an upper face of the suspension component.

In a preferred embodiment the vehicle has at least two front suspension assemblies, each suspension assembly having at least one suspension component. Preferably the vehicle has at least two rear suspension assemblies, each suspension assembly comprising at least one suspension component.

Viewed from a yet further aspect the present invention provides a method of monitoring the load condition of a vehicle having suspension components comprising:

monitoring the deflection angle of the (or each) suspension component; and generating an output signal from a controller which is representative of the load condition.

Preferably the method further comprises:

measuring the tare angle of at least one suspension component using an inclinometer or accelerometer mounted on a single suspension component, storing said angle in the controller and setting a lower threshold corresponding to said tare angle;

measuring the load angle of at least one suspension component using an inclinometer or accelerometer mounted on a single suspension component, storing said angle in the controller and setting an upper threshold corresponding to said load angle;

comparing the deflection angle to the upper and lower threshold and using said comparison to determine the load condition; and generating an output signal from the controller when either of the upper or lower threshold is reached.

Preferably the method further comprises:

measuring the attitude of the vehicle using a reference device mounted on the vehicle;

the controller receiving the reference signal and adjusting the tare angle and the load angle for the or each suspension component to account for the attitude of the vehicle prior to loading the vehicle.

In a preferred embodiment, the vehicle has at least two front suspension assemblies, each suspension assembly having at least one suspension component, the method further comprising:

generating an output signal from the controller which is representative of the load condition with reference to the front suspension assemblies only.

In a preferred embodiment, the vehicle has at least two rear suspension assemblies, each suspension assembly comprising at least one suspension component, the method further comprising the steps of:

generating an output signal from the controller which is representative of the load condition with reference to the rear suspension assemblies only.

Preferably the method further comprises:

setting an intermediate threshold, the value of the intermediate threshold being between 30% and 98% of the value of the upper threshold; and, the controller generating an output signal when the deflection angle reaches the intermediate threshold point.

Particularly preferably the value of the intermediate threshold is between 40% and 98% of the value of the upper threshold, more preferably between 50% and 98% of the value of the upper threshold, yet more preferably between 60% and 98% of the value of the upper threshold (typically 80% of the value of the upper threshold).

Preferably the method further comprises:

monitoring the deflection angle of at least one suspension component at two separate time intervals;

determining the difference of the deflection angles from the two separate time intervals; and the controller generating a disturbance signal indicating that motion is detected if the difference is greater than a pre-determined amount.

Preferably the method further comprises the controller sampling the deflection angle at discrete intervals and storing the sampled data as n sample sets each comprising a number of samples, where n is an integer; and the controller generating a disturbance signal indicating that motion is detected if the difference between two successive sample sets is greater than a pre-determined value.

In accordance with the invention, the state of loading or load condition of the vehicle may be the payload or the applied payload weight, gross vehicle weight or axle weight. In accordance with the invention, the state of loading of the vehicle may be a fraction of maximum full loading or overload.

DRAWINGS

The invention will now be described in a non-limitative manner solely by way of example and with reference to the accompanying drawings in which:

FIGS. 10 and 10.1 A flowchart illustrating the installation, calibration and operation of an embodiment of the invention.

DETAILED DESCRIPTION OF THE DRAWINGS

Figure 1:
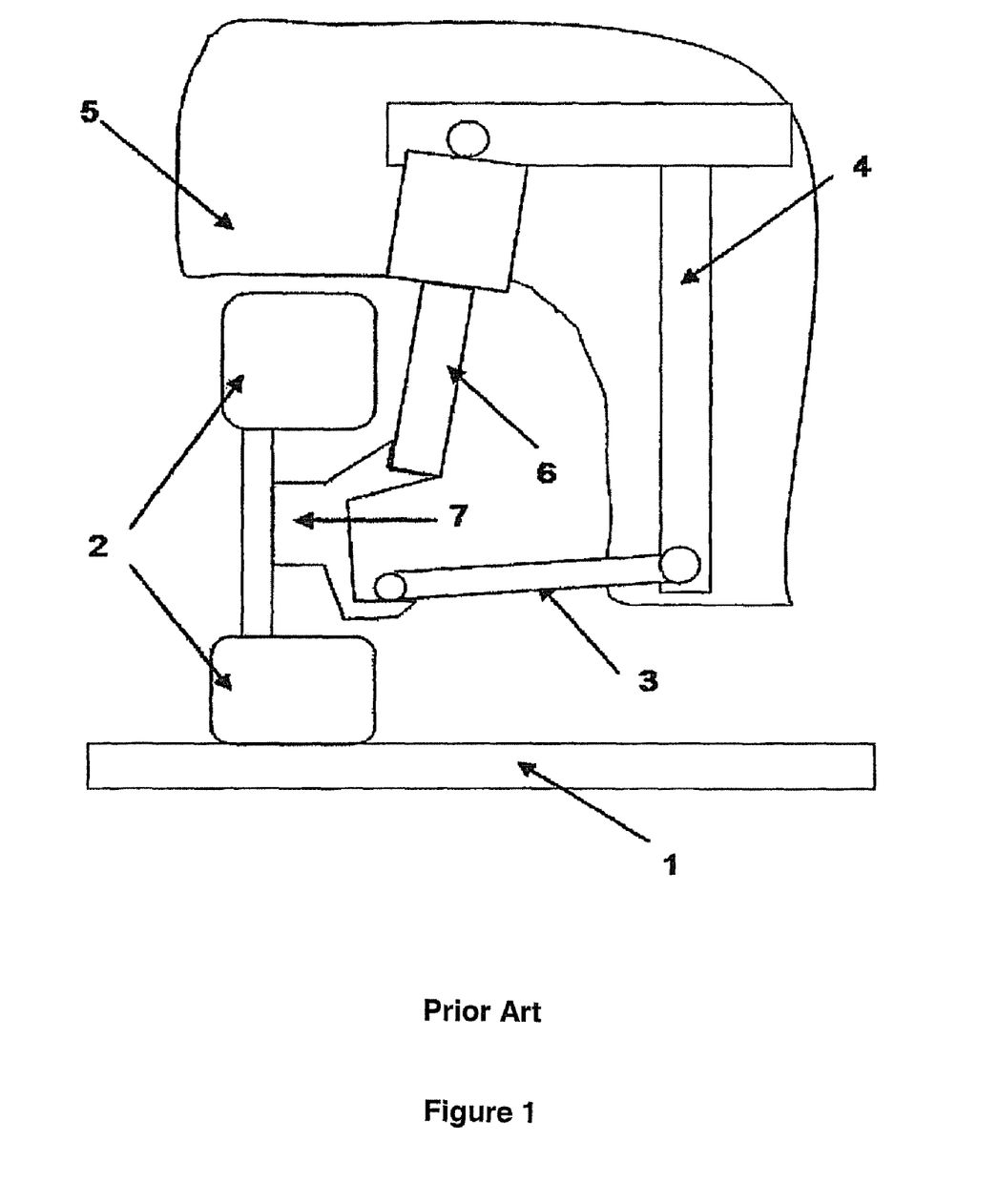
FIG. 1 A view of a conventional coiled spring damper combination vehicle suspension assembly.

In FIG. 1, an arrangement of components common to many vehicles is illustrated. The ground (1) is shown in section supporting a wheel (2) at a corner of a vehicle. Drive components are omitted for clarity. The wheel (2) is attached to the vehicle by a hub (7) which is supported by a sprung damper assembly (6) and struts (3) (only one of which is shown for clarity). The sprung damper assembly (6) and struts (3) which are components of the suspension assembly have bearings at each end allowing constrained movement of the hub (7). These bearings are attached to points on a vehicle chassis (4) or body (5) depending on vehicle design.

Figure 2:
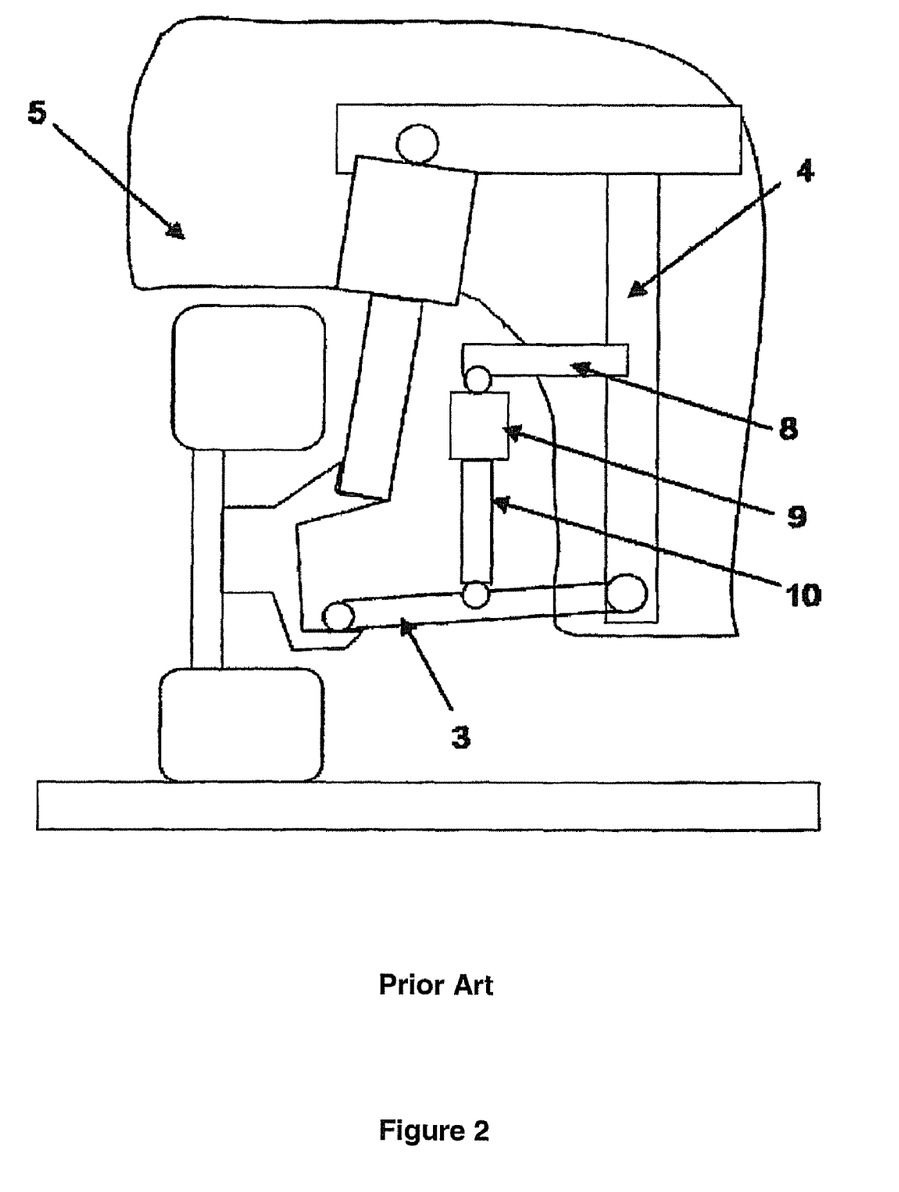
FIG. 2 A view of a conventional suspension-monitoring device relying on two point mounting.

In FIG. 2, a conventional weighing system is shown fitted to the suspension assembly illustrated in FIG. 1. The weighing system consists of two parts (9) and (10) intimately coupled together. The part (9) is connected to the vehicle chassis (4) by a suitable fitting part (8). The part (10) is fitted to the strut (3). The parts (9) and (10) are fitted to their respective supports by bearings. The relative interaction of the two parts (9) and (10) is characteristic of the movement of the vehicle chassis (4) relative to the suspension assembly.

Figure 3:
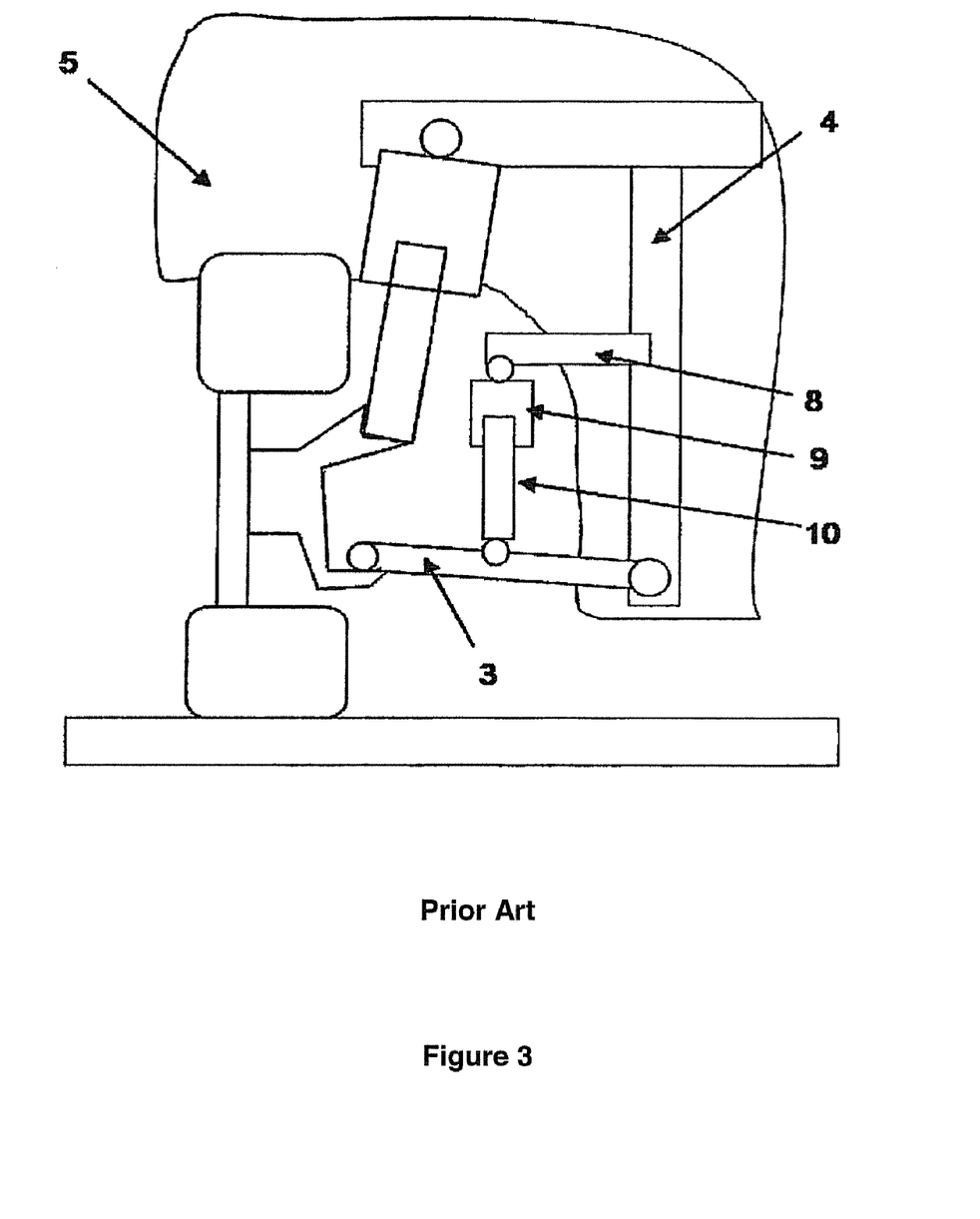
FIG. 3 A view of the conventional suspension-monitoring device of FIG. 2 under an increased vehicle load.

FIG. 3 shows the same suspension assembly illustrated in FIG. 2 but under increased vehicle loading. The position of the strut (3) relative to the vehicle chassis (4) or body (5) has changed and the sprung damper assembly (6) has reduced in length. It is clear that parts (9) and (10) are dynamic and move relative to each other either within themselves (or otherwise) or impart forces on each other. The relative movement or these forces can cause problems with ingress of unwanted material into the moving parts or over-travel events. It is also evident that being fitted in an open environment, these parts are potentially at risk of damage from unknown resilient foreign bodies thrown up from the road at great speed.

Embodiments illustrated in FIGS. 4-9 and described hereinbelow wherever possible have common numbering with FIGS. 1-3.

Figure 4:
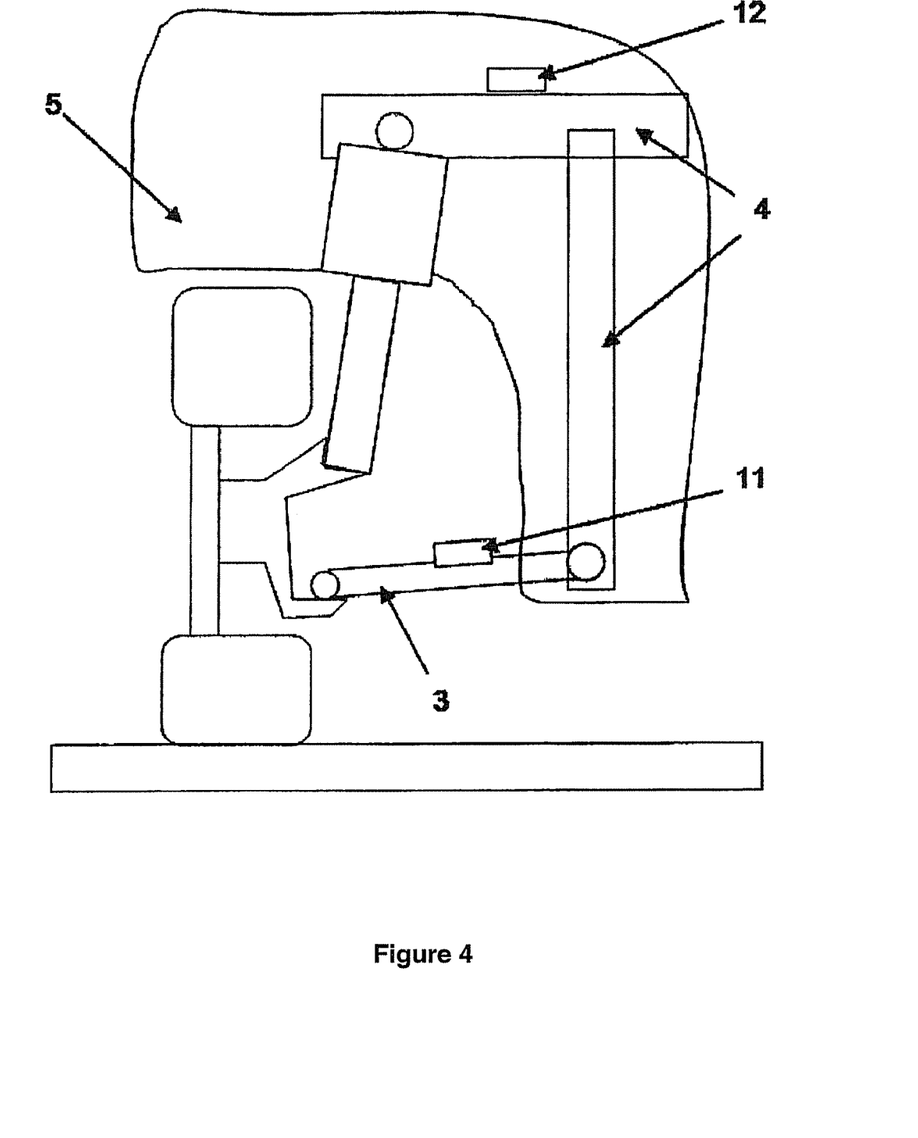
FIG. 4 A view of a first embodiment of the present invention assembled on a spring damper suspension assembly.

FIG. 4 illustrates a first embodiment of the present invention fitted to the suspension assembly illustrated in FIGS. 2 and 3. The embodiment is a weighing system comprising a transducer (11) intimately mounted on or adhered to a strut (3) and a reference device (12) for monitoring the inclination of the chassis (4) or body (5) mounted remotely from the suspension components. A supervisory device (not shown in the drawings) monitors the transducers (11, 12). From a knowledge of signal outputs at several fixed positions (established on fitting and subsequent installation checks), the supervisory device is able to infer the state of loading or of overload of a vehicle in service. The reference device (12) moderates the behaviour of the supervisory device in order to take account of vehicle use on an incline.

Figure 5:
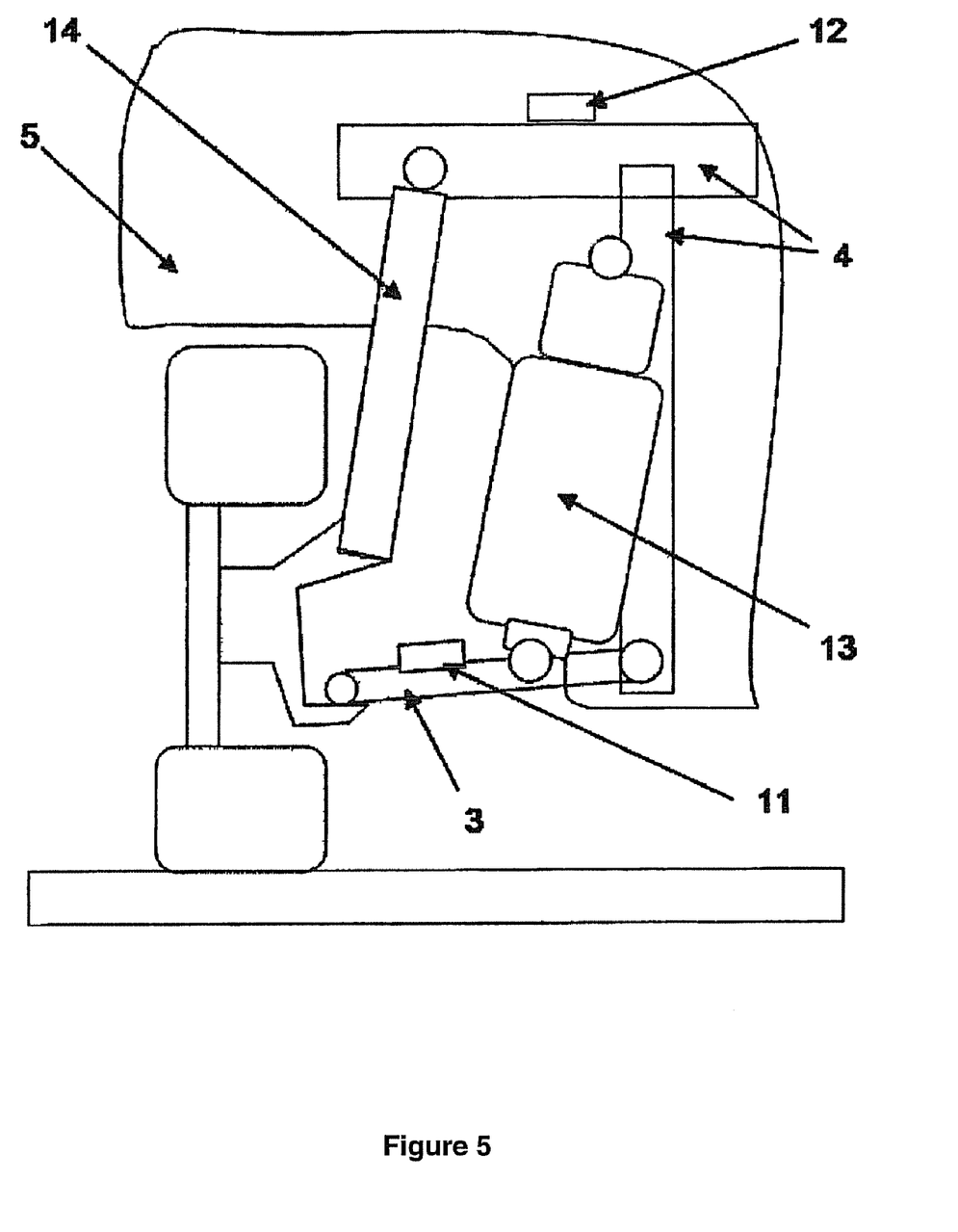
FIG. 5 A view of a second embodiment of the present invention assembled on an airbag spring with remote damper suspension assembly.

FIG. 5 illustrates a second embodiment of the present invention fitted to a suspension assembly comprising an airbag spring (13).

Figure 6:
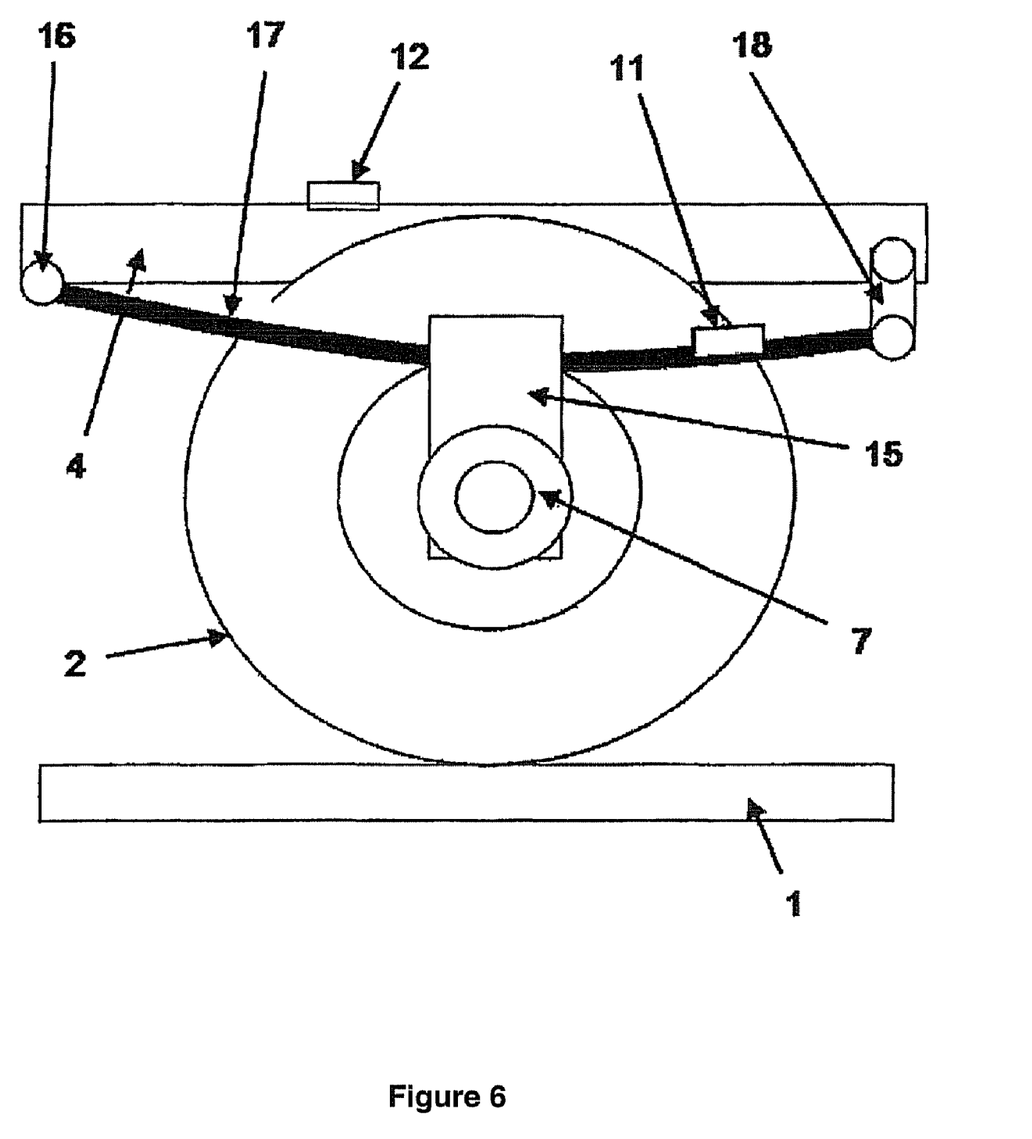
FIG. 6 A view of a third embodiment of the present invention assembled on a leaf spring suspension assembly.

FIG. 6 illustrates a third embodiment of the present invention fitted to a leaf spring suspension assembly. The hub (7) is connected to the leaf spring (17) by saddles and u-bolts (15). The leaf spring (17) is held in place on the chassis (4) by a set of pins and shackles (16,18) which constrain the movement of the spring (17). The transducer (11) is intimately mounted on the leaf spring (17).

Figure 7:
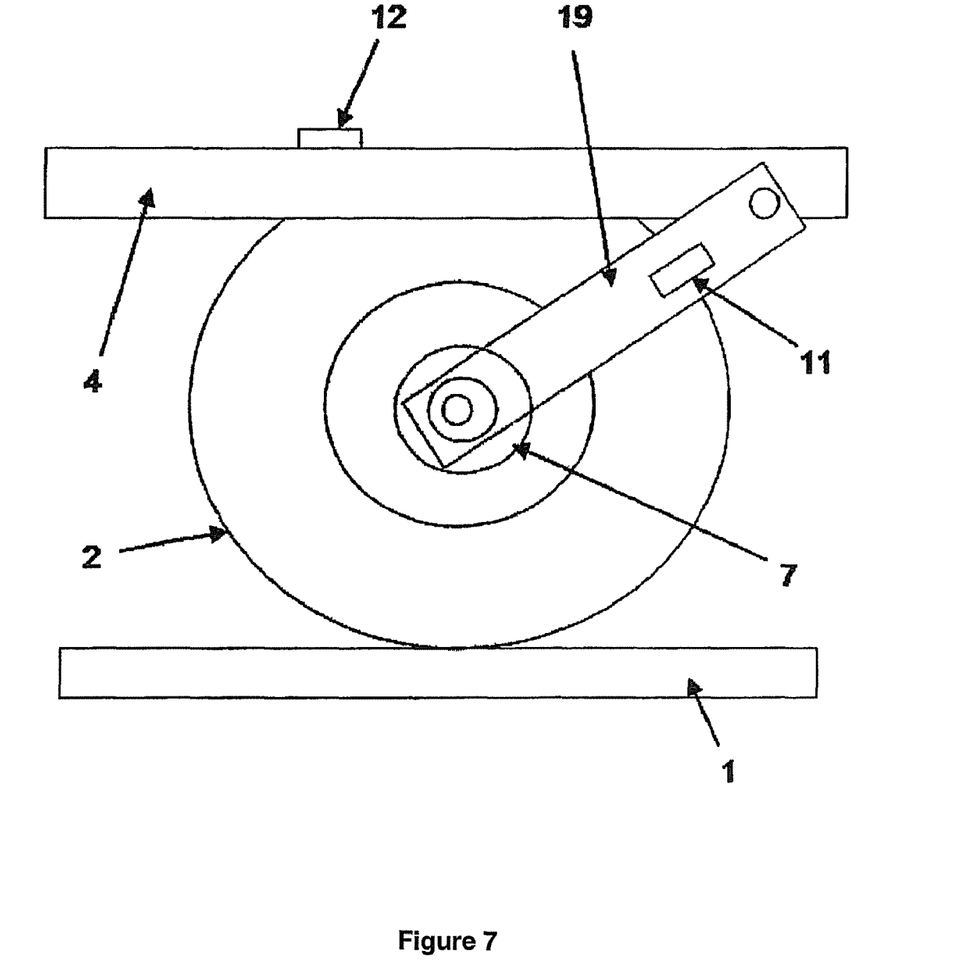
FIG. 7 A view of a fourth embodiment of the present invention assembled on a rubber suspension assembly.

FIG. 7 illustrates a fourth embodiment of the present invention fitted to a trailing arm type or rubber suspension assembly. The latter utilises a short arm (19) to support the hub (7). The short arm (19) is constrained to move by rubber supports which react to movement of the short arm (19) relative to the chassis (4).

In all of these Figures, the necessary electrical cabling or any powertrain or driveshaft components are omitted for the sake of clarity.

Figure 8:
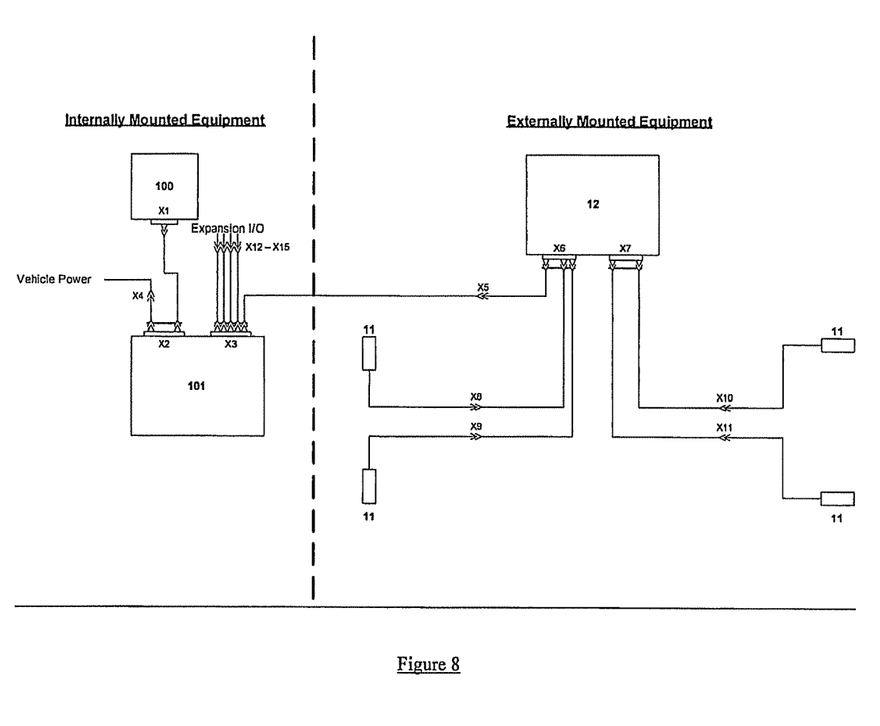
FIG. 8 A schematic layout of an embodiment of the present invention.

FIG. 8 shows a schematic layout of an embodiment of the present invention. A transducer (11) is mounted on a suspension component of each wheel. The transducers (11) are in electrical communication with the controller via a reference device (12) and a power supply unit (101).

The transducers (11) in this embodiment incorporate an inclinometer and capability to generate an output signal in accordance with the measured angle. Transducers (11) of this nature are well known in the art. An example of such a transducer is an Analog Devices ADXL203 Dual axis accelerometer/inclinometer.

The reference device (12) measures the attitude of the vehicle. If the vehicle is on an incline, either longitudinally or latitudinally, the offset experienced by the suspension components can be accounted for and the associated threshold values (described below) adjusted accordingly. The reference device (12) therefore comprises a pair of inclinometers held in an orthogonal relationship such that the longitudinal and latitudinal angular displacement with respect to level can be ascertained. The reference device also contains circuitry such that signal processing can be performed on the signals relating to the attitude of the vehicle and suspension component angles in order to incorporate them into a single output signal for the controller (100) to receive via the power output. The man skilled in the art will appreciate that this is a matter of convenience rather than necessity and that the signal processing can take place in the controller.

The controller (100) comprises a microprocessor and some memory, such that the microprocessor can be programmed with suitable algorithms for receiving and manipulating the signal from the reference device in order to produce the required output representative of the load condition. The software/algorithms used for this operation require standard operations as would be familiar to the man skilled in the art. The output signal generated by the controller (100) can be used by a sensory device such as a flashing strobe light or siren which are connected via the expansion input/outputs as connected to the power supply unit (101). There is a display unit incorporated into the controller (100). The display of the display unit can be used to show the load condition to, for example, the person loading the vehicle or driver by producing a suitable message on the display screen such as showing the percentage of the threshold values of the load condition. The display unit can be used as a programming interface for programming the controller (100). The display is provided with a number of touch buttons corresponding to various menu options presented on the display screen, whereby the operator will be presented with a first menu upon powering up the system. Navigating numerous menus will allow a user to program the controller for various different types of transducers (11) and for various different vehicles within the options setup in the controller memory.

An example of this type of display with integral controller is a Vansco model number VMD1216A. This is a commercially available unit which communicates using the Control Area Network (CAN) protocol which is well known in the art for such applications. The VMD1216A comprises an Infinian C164 micro controller, 512 kb flash (re-programmable without disassembly), 128 kb of RAM and 8 kb of EEPROM. It also comprises five input buttons on the face of the unit for programming the controller (100).

Figure 9:
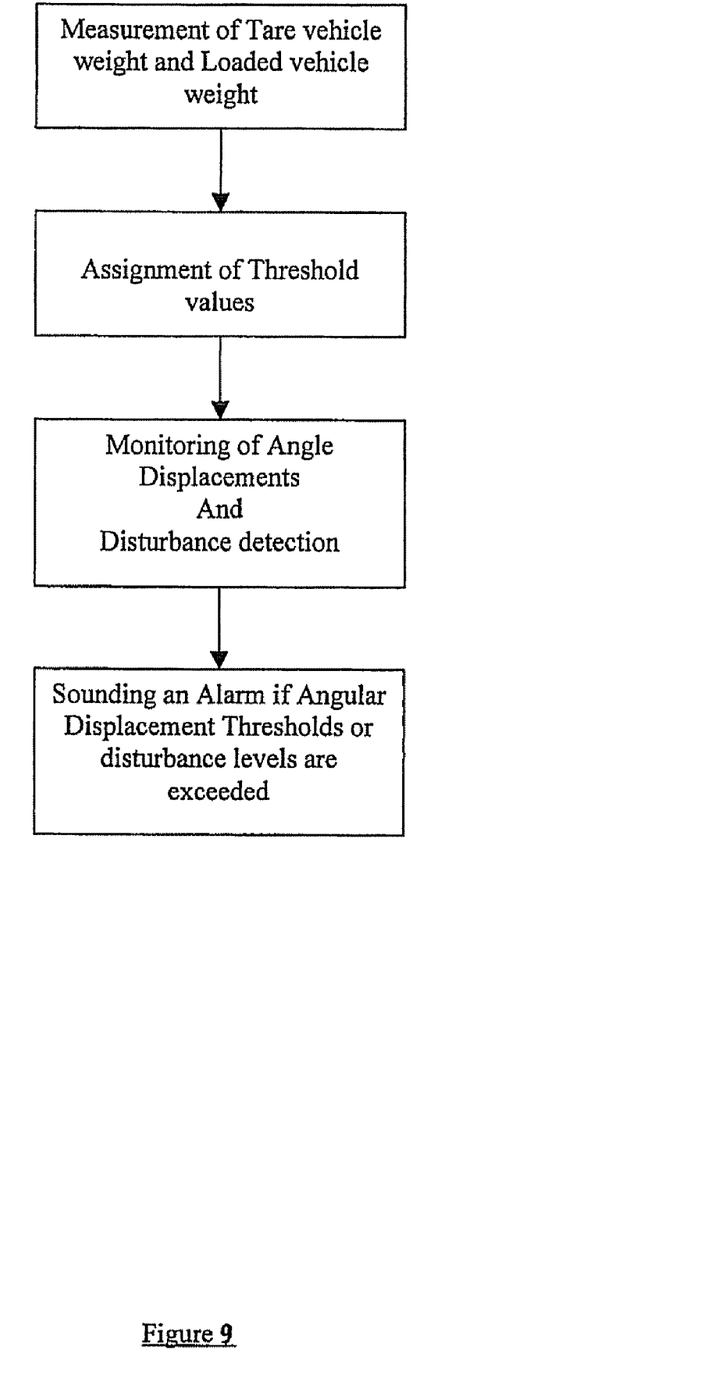
FIG. 9 A flowchart illustrating operation of an embodiment of the invention.
Figure 100:
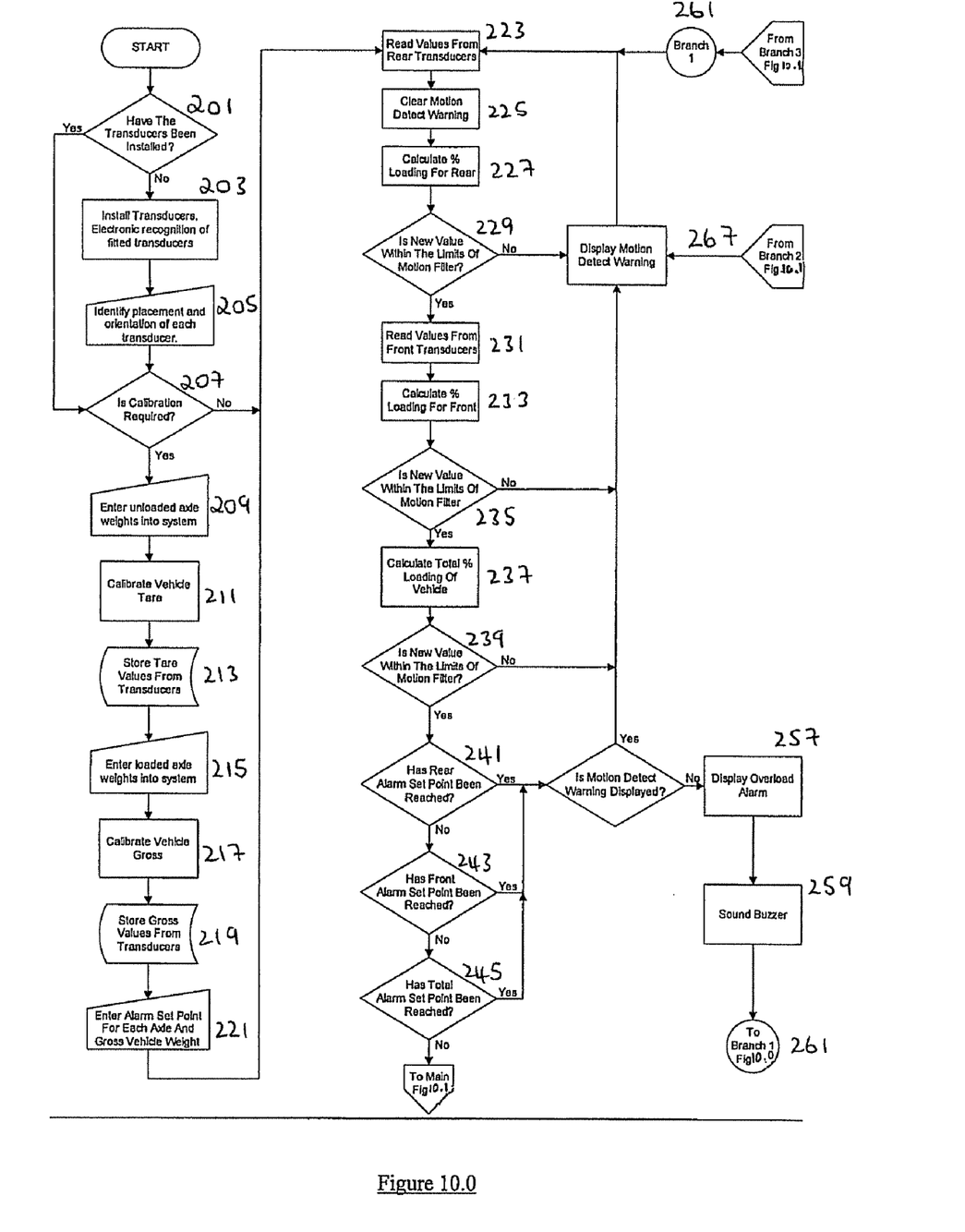

FIG. 9 is a flowchart illustrating the operation of an embodiment of the invention. Each of the transducers (11) which are mounted on the moveable suspension components as shown in FIGS. 4, 5, 6 and 7 comprise an inclinometer to measure the angular displacement of the suspension component. The transducer (11) produces and outputs a signal corresponding to the measured angular deflection. This is used by a controller (100) to generate a signal representative of the load condition of the vehicle as related to the angular deflection of the suspension component. To put the angular deflection in context, a first set threshold values for the angular deflection experienced by the suspension component is obtained ie the angle of the suspension component is measured whilst the vehicle is empty and while it is carrying a full load (the so-called tare angle and load angle respectively). These measurements are carried out on flat ground and the tyres must be properly inflated. Once the tare angle and load angle have been measured the corresponding output signal from the or each transducer (11) is fed into the controller. The controller (100) defines a relationship between the tare weight of the vehicle (which has been previously measured and loaded into the controller) and the tare angle. The same is done for the load weight and load angle. The value of the tare angle is set as the tare threshold or 0% point. The value of the load angle is set as an upper'threshold point or 100% point. There is a further lower threshold which is typically set between 60% and 98% and more typically set at 80% of the upper threshold. Using these set points the controller (100) can attribute an angular displacement with a percentage loading. As the vehicle is loaded with a load, the load condition can be continually monitored by the controller and an output signal generated when the upper threshold has been reached for a given suspension component. This embodiment can also detect whether there is any continued disturbance during the monitoring of the load condition to ascertain whether loading of the vehicle has ceased. This is accomplished by detecting any alteration in the angular displacement in the suspension components by comparing the average values of the angular displacements at different time intervals. If the vehicle is still being loaded, a signal is generated by the controller to indicate that a load condition cannot be properly determined.

Figure 101:
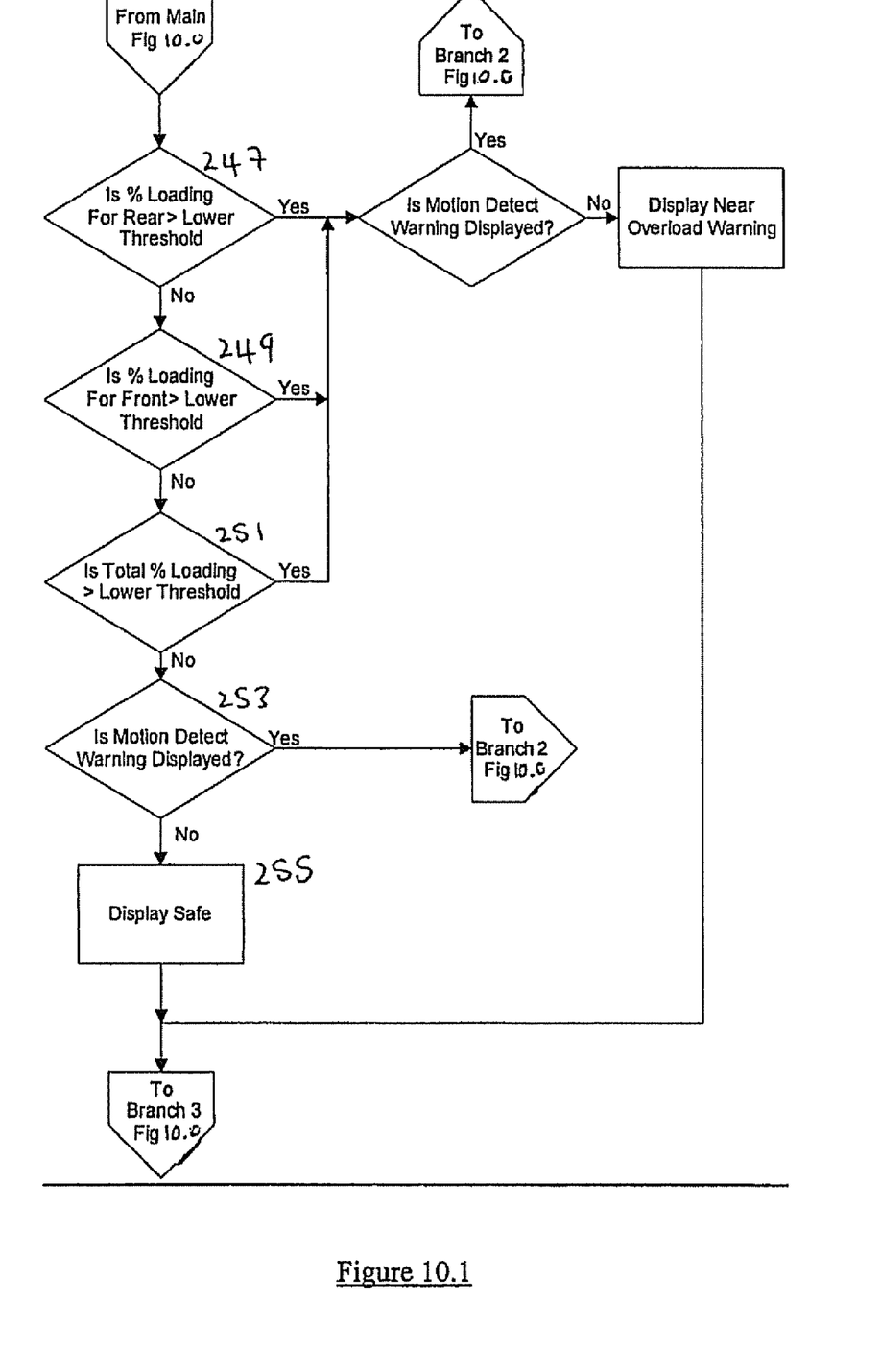

With reference to FIGS. 10 and 10.1, the installation, calibration and operation of the device will be described in more detail.

Installation (201-207): The first step is to ascertain whether the transducers (11) have been electronically (rather than mechanically) installed (201). Every time a new type of transducer (11) is used it must be registered with the controller in order for the controller to be properly configured for the appropriate output signal from the transducer. Installation is achieved by selecting the model number of the commercially available transducer (11) from a pre-programmed list held in the controller memory. This is done by using the menu selection process described above. It is also necessary to identify which wheel/suspension assembly the transducer (11) is placed on (eg the front offside) and the orientation of the transducer (11). The orientation refers to the position of the transducer (11) relative to the longitudinal axis of the vehicle chassis. For example, in FIG. 9, the two rightmost transducers (11) are represented as being in-line with the longitudinal axis of the vehicle whereas the two leftmost transducers (11) are perpendicular for the longitudinal axis of the vehicle. Once this has been established, it is necessary to decide whether calibration is required (207).

Calibration (209-221): Calibration is necessary to set the upper and lower threshold values for the system. It is required after any maintenance on the system or the vehicle such as for example the replacement of a suspension component or transducer. The purpose of calibration is to measure the angular displacement of the loaded and unloaded vehicle in order to have a reference frame within which the system can operate. The tare, upper and lower threshold values correspond to the angular displacement of the suspension component when the vehicle has no load, a maximum load and between 60% and 98% (more typically 80%) of the upper threshold respectively. In (209) the unloaded axle weights are entered into the controller and the angular displacement of the suspension component is measured to give the vehicle tare angle. This value is then stored (213) for future reference. The vehicle is then loaded to its maximum load weight which is achieved by loading the vehicle on a weighbridge (or weigh-pads) before measuring the angular displacement of the suspension components (217) and storing these values in the controller. The final calibration step (221) is to set an alarm point for both of the axles and the gross vehicle weight.

Operation (223-263): In operation, the controller cycles through a continuous loop whereby the values from the rear transducers (11) and front transducers (11) are continually monitored and their condition assessed. The first step is to take the values from the rear transducers (11) (223) and use the controller to calculate a percentage loading for the rear axle when compared to the upper threshold for the rear axle (227). The next step is clearing the motion detect warning system (225). After calculating the load for the rear axle as a percentage (227), the value is put through the motion filter in order to ascertain whether the vehicle is still being loaded (229). The motion filter is an averaging filter used to compare the value of the angular displacements taken at two separate time intervals. The controller samples the angular displacement over a time period and stores these values in a sample set comprising n samples (where n is an integer). By comparing the difference in the average of two sample sets with a pre-determined value, the presence of motion can be detected. The size of the sample sets and the value of the pre-determined value are dependent on the dynamic properties of the vehicle in question. The factors to be considered are the amount of deflection and the frequency of oscillation to be accounted for. If the percentage loading for the rear does not pass through the limits of the motion filter, a warning is displayed on the display unit (100) and the controller returns to step (223) to read the values from the rear transducer again. This process is repeated until the motion detector confirms there is no further disturbance in the vehicle as a result of loading upon which time the controller captures the values from the front transducers (231) and calculates the percentage loading for the front axle (233). The percentage value for the front axle is fed through the motion filter and if the limits are exceeded, the display unit (100) motion detect warning system is activated and the controller turns to step (223). This process is repeated again until the percentage loading for the front axle passes through the motion filter. The controller then calculates the total percentage loading of the vehicle on the basis of the front and rear axle loadings prior to passing the value through the motion filter. If the value does not pass through the motion filter, the display unit (100) displays motion detect warning and the controller returns to step (223). However, if the value passes through the motion filter the controller compares the loading values to the alarm set points which correspond to the threshold values for the upper limits as set in (221). If the rear alarm set point has been reached (241), the controller checks whether the display is displaying the motion detect warning. If it is, the controller returns to step (223). If not the display unit overload alarm output is activated (257) and a buzzer is sounded (259). Having sounded the alarm the controller returns to step (223) via (261). The same process is repeated for the front alarm set point and the total alarm set point (243, 245). If the alarm set points have not been reached for either the rear, front or total percentage of vehicle loading values then the controller proceeds to step (247). A comparison of the percentage loading to the rear lower threshold is then executed. If the controller detects that the lower threshold has been exceeded the display unit is checked to ascertain as to whether the motion detect warning displayed. If the motion detect warning system is activated the controller returns to step (263). If the motion detect warning is not displayed then the near overload warning system is activated causing a near overload siren to be sounded. If, on the other hand, the lower threshold is not exceeded in any of the rear then a check is made to ascertain whether the display unit (100) is displaying the detect warning yet again. If it is not then the display unit (100) signals that the loading is safe. If there is motion detected then the controller (100) returns to step (263). This process is repeated for the front and total percentage loading values.

What is claimed is:

1. A system for indicating a weight of payload of a vehicle having suspension components comprising:
a static gravity-sensing accelerometer mounted on at least one suspension component and configured as an inclinometer to measure a deflection angle of the at least one suspension component; a controller configured to generate an output signal representative of the weight of payload of the vehicle, wherein the controller uses the deflection angle to generate the output signal; and
a sensory output device which indicates the weight of payload of the vehicle in response to the output signal of the controller; wherein the controller is configured to compare the measured deflection angle of the at least one suspension component to a predetermined threshold and generate the output signal when the measured deflection angle reaches the predetermined threshold.

2. The system as claimed in claim 1, further comprising:
at least one reference device adapted to generate a reference signal relating to the attitude of the vehicle, wherein the controller is further configured to receive the reference signal and adapt the output signal representative of the load condition to account for a variance in the measured deflection angle of the suspension component created by the attitude of the vehicle.

3. The system as claimed in claim 1, wherein the sensory output device comprises a display configured to show the load condition of the vehicle.

4. The system as claimed in claim 1, wherein the sensory output device comprises a flashing strobe light, a siren, or a buzzer.

5. The system as claimed in claim 1, wherein the at least one of an inclinometer or an accelerometer comprises a wireless signal transmitter and wherein the controller comprises an associated wireless signal receiver such that the at least one of an inclinometer or an accelerometer and the controller may communicate with each other over a wireless channel.

6. A method of monitoring the weight of payload of a vehicle having suspension components, comprising:
monitoring a deflection angle of at least one suspension component using a static gravity-sensing accelerometer mounted on the at least one suspension component and configured as an inclinometer; comparing the deflection angle of the at least one suspension component to a predetermined threshold; generating an output signal which is representative of the weight of payload of the vehicle when the deflection angle reaches the predetermined threshold; and using the output signal to activate a sensory output device which indicates the weight of payload of the vehicle.

7. The method as claimed in claim 6, wherein the sensory output device shows the load condition of the vehicle on a display.

8. The method as claimed in claim 6, wherein the sensory output device displays or sounds at least one of an overload warning or a near overload warning.

9. The method as claimed in claim 6, further comprising:
monitoring the deflection angle of the at least one suspension component at two separate time intervals;
determining the difference of the deflection angles from the two separate time intervals; and
generating a disturbance signal indicating that motion is detected if the difference is greater than a predetermined amount.

10. The method as claimed in claim 6, further comprising:
sampling the monitored deflection angle at discrete intervals and storing the sampled data as n sample sets each comprising a number of samples, where n is an integer; and
generating a disturbance signal indicating that motion is detected if the difference between two successive sample sets is greater than a predetermined value.

11. A method of monitoring the weight of payload of a vehicle having suspension components comprising:
monitoring a deflection angle of at least one suspension component using a static gravity-sensing accelerometer mounted on the at least one suspension component and configured as inclinometer; comparing the monitored deflection angle to a predetermined threshold; and activating a sensory output device when the monitored deflection angle reaches the predetermined threshold.

12. The method as claimed in claim 11, wherein the sensory output device indicates the load condition of the vehicle.

13. The method as claimed in claim 11, wherein the sensory output device shows the load condition of the vehicle on a display.

14. The method as claimed in claim 11, wherein the sensory output device displays or sounds at least one of an overload warning or a near overload warning.

* * * * *

UNITED STATES PATENT AND TRADEMARK OFFICE
CERTIFICATE OF CORRECTION

PATENT NO.         : 8,412,485 B2                                          Page 1 of 1
APPLICATION NO.    : 12/797968
DATED              : April 2, 2013
INVENTOR(S)        : Duncan Brown It is certified that error appears in the above-identified patent and that said Letters Patent is hereby corrected as shown below:

Title page 2, under Foreign Patent Documents insert
-- UK 0623802.6 filed 11/29/06 --;

In the Specification

Column 2, Line 20;
"mountable mountable" should be -- mountable --;

Column 4, Line 49;
"Fig 1A" should be -- Fig 1 A --.

Signed and Sealed this
Seventeenth Day of December, 2013

Margaret A. Focarino
*Commissioner for Patents of the United States Patent and Trademark Office*